United States Patent [19]
Myers

[11] Patent Number: 5,991,133
[45] Date of Patent: Nov. 23, 1999

[54] PORTABLE VIDEO CASSETTE PLAYER FOR CHILDREN

[76] Inventor: Alice L. Myers, 1057 Paper Mill Rd., Chambersburg, Pa. 17201

[21] Appl. No.: 08/988,652

[22] Filed: Dec. 11, 1997

[51] Int. Cl.⁶ .............................. G11B 33/02; G09B 5/06; H04N 5/64
[52] U.S. Cl. ..................... 360/137; 348/838; 434/307 R; 434/309
[58] Field of Search .................................. 360/84, 85, 92, 360/130.21, 130.22, 137; 358/906; 348/836, 837, 838, 839, 840, 841, 842, 843; 434/307 R, 308, 309, 310

[56] References Cited

U.S. PATENT DOCUMENTS

| | | | |
|---|---|---|---|
| 4,809,089 | 2/1989 | Richie | 360/33.1 |
| 4,825,295 | 4/1989 | Ishilawa et al. | 358/254 |
| 4,831,449 | 5/1989 | Kimura | 358/198 |
| 5,206,733 | 4/1993 | Holdredge et al. | 358/254 |
| 5,281,985 | 1/1994 | Chan | 353/13 |
| 5,493,347 | 2/1996 | Fukuda | 348/836 |
| 5,673,090 | 9/1997 | Higuchi et al. | 348/836 |
| 5,675,426 | 10/1997 | Meisner et al. | 358/838 |
| 5,742,358 | 4/1998 | Iijima et al. | 348/789 |
| 5,748,254 | 5/1998 | Harrison et al. | 348/552 |

*Primary Examiner*—David L. Ometz

[57] ABSTRACT

A compact video cassette player for children is provided including a housing with a front face, a rear face, a top face, a bottom face and a pair of side faces. The top face has a handle mounted thereto. A light assembly is equipped with a lamp for illuminating upon the receipt of power. Further included is a video cassette player assembly having a display mounted on the front face of the housing; a plurality of control buttons including a start button, stop button, rewind button, eject button and actuator button; and a speaker positioned on the housing. The video cassette player assembly also has a video cassette player mechanism having an inlet for receiving a video cassette so as to display video and audio signals from the video cassette via the display and the speaker, respectively, in accordance with the depression of the control buttons. Further, a power unit is provided for supplying the light assembly and video cassette player assembly with power.

9 Claims, 3 Drawing Sheets

PORTABLE VIDEO CASSETTE PLAYER FOR CHILDREN

BACKGROUND OF THE INVENTION

1. Field of the Invention

The present invention relates to video cassette recorders and more particularly pertains to a new portable video cassette player for entertaining children.

2. Description of the Prior Art

The use of video cassette recorders is known in the prior art. More specifically, video cassette recorders heretofore devised and utilized are known to consist basically of familiar, expected and obvious structural configurations, notwithstanding the myriad of designs encompassed by the crowded prior art which have been developed for the fulfillment of countless objectives and requirements.

Known prior art video cassette recorders include U.S. Pat. Nos. 4,843,477; 4,012,787; Des. 310,522; 3,908,083; and 5,387,136.

In these respects, the portable video cassette player for children according to the present invention substantially departs from the conventional concepts and designs of the prior art, and in so doing provides an apparatus primarily developed for the purpose of entertaining children.

SUMMARY OF THE INVENTION

In view of the foregoing disadvantages inherent in the known types of video cassette recorders now present in the prior art, the present invention provides a new portable video cassette player for children construction wherein the same can be utilized for entertaining children.

The general purpose of the present invention, which will be described subsequently in greater detail, is to provide a new portable video cassette player for children apparatus and method which has many of the advantages of the video cassette recorders mentioned heretofore and many novel features that result in a new portable video cassette player for children which is not anticipated, rendered obvious, suggested, or even implied by any of the prior art video cassette recorders, either alone or in any combination thereof.

To attain this, the present invention generally comprises a housing having rectangular configuration. As shown in FIGS. 1 & 2, the housing has a square front face, a square rear face, a rectangular top face, a rectangular bottom face and a pair of rectangular side faces. For carrying purpose, the top face has a handle mounted thereon. Next provided is a light assembly including a vertically oriented thin linear recess formed in the rear face of the housing. The recess resides in communication with the top face thereof. A hemispherical recess is formed in the rear face such that the linear recess intersects the hemispherical recess. The light assembly further includes a first elongated rod having a first end pivotally coupled within the recess adjacent to the top face of the housing. A second short rod has a first end pivotally coupled to a second end of the first elongated rod. A lamp with a hemispherical cover is pivotally coupled at a periphery thereof to a second end of the second short rod. During use, the rods and lamp may be removably situated within the recesses and illuminated upon the receipt of power. Next provided is a video cassette player assembly including a display mounted on the front face of the housing. The display has a surface area less than that of the front face. A plurality of color coded control buttons are mounted to the front face of the housing between the display and one of the side faces of the housing. As shown in FIG. 1, such control buttons include a start button, stop button, rewind button, eject button and actuator button. A speaker is positioned on the front face of the housing between the display and one of the side faces of the housing opposite the control buttons. The video cassette player assembly further includes a video cassette player mechanism having an inlet situated on the front face of the housing below the display. The inlet serves to receive a video cassette so as to display video and audio signals from the video cassette from the display and the speaker, respectively. This operation may be governed in accordance with the depression of the control buttons. Finally, a power unit is included for supplying power to the lamp assembly and video cassette player assembly. The power unit includes a compartment formed in the rear face of the housing adjacent to the bottom face thereof. The compartment has a battery holster, an auxiliary power jack situated therein, and an interior space. The power unit further includes a first power connector for being removably connected between a conventional alternative current source and the auxiliary power jack. Associated therewith is a second power connector for being removably connected between a cigarette lighter of a vehicle and the auxiliary power jack. Prior to use, the power connectors may be stored in the interior space and a cover removably mounted thereover for containing the same in the compartment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable video cassette player for children apparatus and method which has many of the advantages of the video cassette recorders mentioned heretofore and many novel features that result in a new portable video cassette player for children which is not anticipated, rendered obvious, suggested, or even implied by any of the prior art video cassette recorders, either alone or in any combination thereof.

It is another object of the present invention to provide a new portable video cassette player for children which may be easily and efficiently manufactured and marketed.

It is a further object of the present invention to provide a new portable video cassette player for children which is of a durable and reliable construction.

An even further object of the present invention is to provide a new portable video cassette player for children which is susceptible of a low cost of manufacture with regard to both materials and labor, and which accordingly is then susceptible of low prices of sale to the consuming public, thereby making such portable video cassette player for children economically available to the buying public.

Still yet another object of the present invention is to provide a new portable video cassette player for children which provides in the apparatuses and methods of the prior art some of the advantages thereof, while simultaneously overcoming some of the disadvantages normally associated therewith.

Still another object of the present invention is to provide a new portable video cassette player for children for entertaining children.

Even still another object of the present invention is to provide a new portable video cassette player for children that includes a housing with a front face, a rear face, a top face, a bottom face and a pair of side faces. The top face has a handle mounted thereto. A light assembly is equipped with a lamp for illuminating upon the receipt of power. Further included is a video cassette player assembly having a display mounted on the front face of the housing; a plurality of control buttons including a start button, stop button, rewind button, eject button and actuator button; and a speaker positioned on the housing. The video cassette player assembly also has a video cassette player mechanism having an inlet for receiving a video cassette so as to display video and audio signals from the video cassette via the display and the speaker, respectively, in accordance with the depression of the control buttons. Further, a power unit is provided for supplying the light assembly and video cassette player assembly with power.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
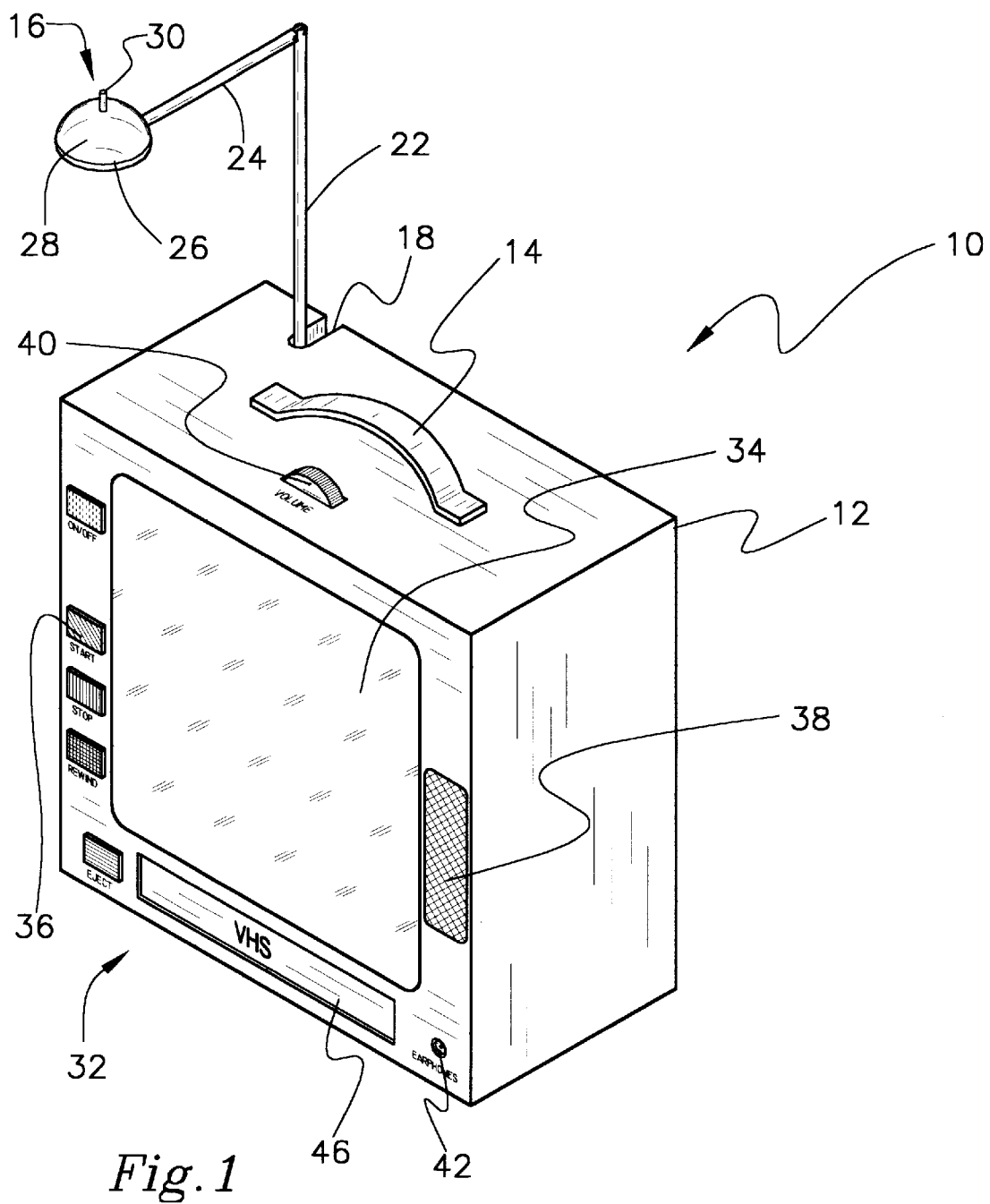
FIG. 1 is a front perspective view of a new portable video cassette player for children according to the present invention.

With reference now to the drawings, and in particular to FIGS. 1 through 4 thereof, a new portable video cassette player for children embodying the principles and concepts of the present invention and generally designated by the reference numeral 10 will be described.

Figure 2:
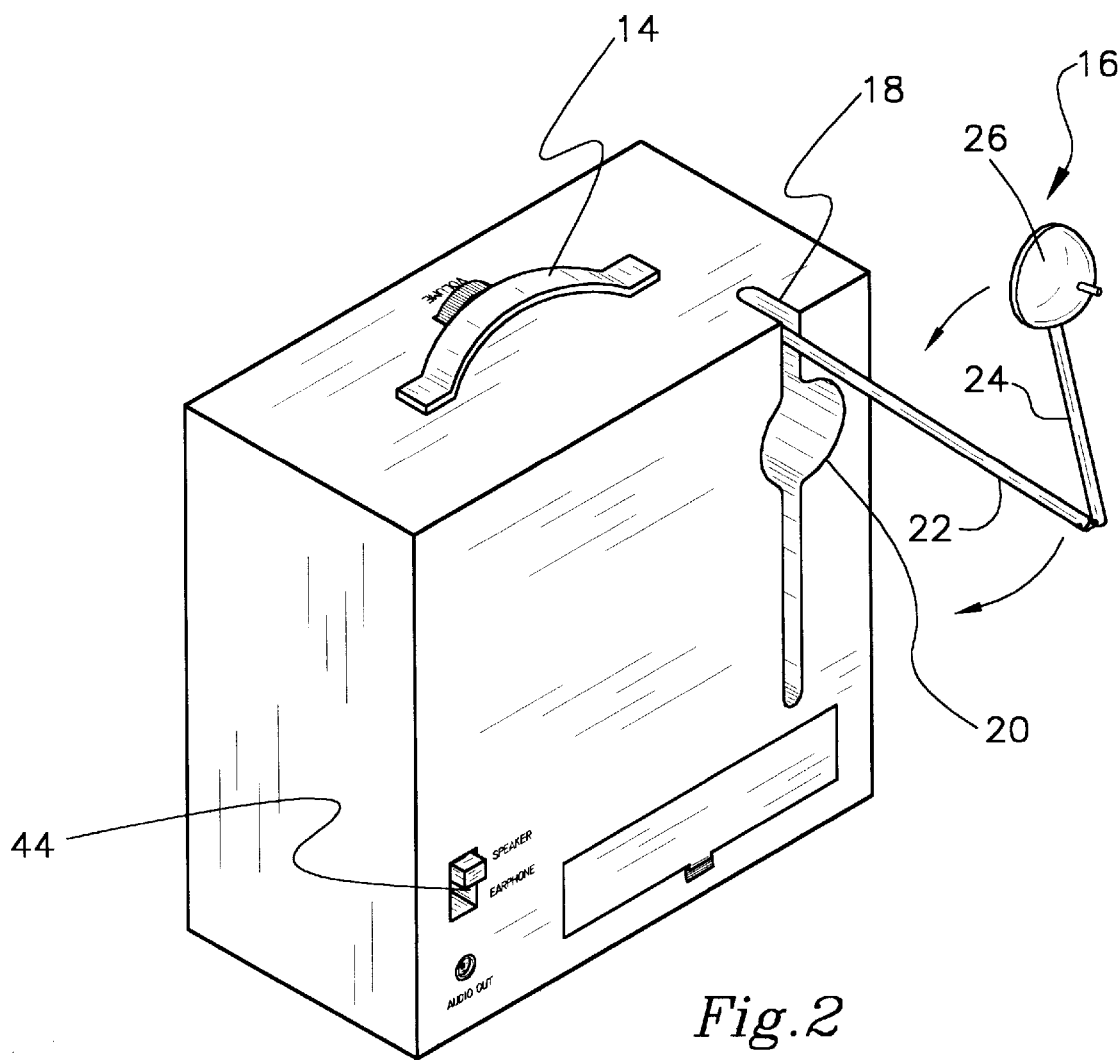
FIG. 2 is a rear perspective view of the present invention.
Figure 3:
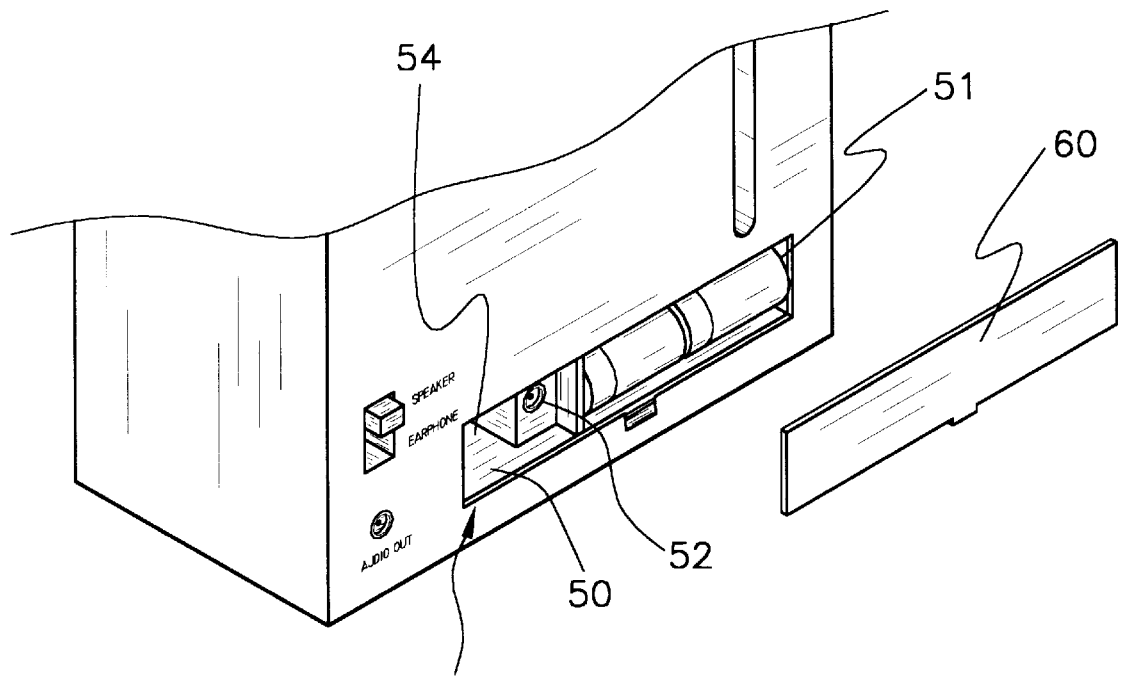
FIG. 3 is another rear perspective view of the present invention.
Figure 4:
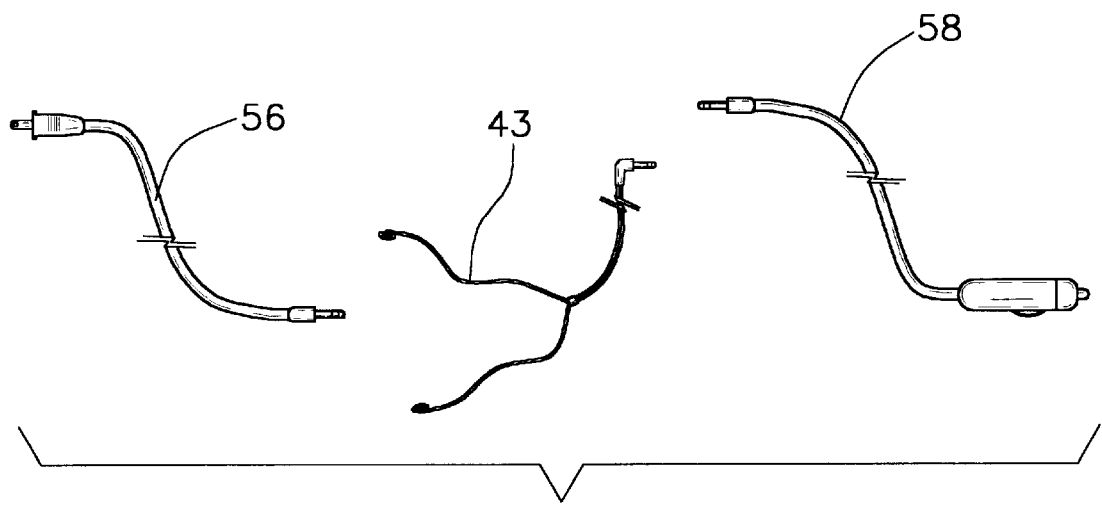
FIG. 4 is an exploded view of the various power connectors and the headphones of the present invention.

The present invention, designated as numeral 10, includes a housing 12 having rectangular configuration. As shown in FIGS. 1 & 2, the housing has a square front face, a square rear face, a rectangular top face, a rectangular bottom face and a pair of rectangular side faces. Ideally, the housing has a height of 12 inches, a length of 12 inches and a depth of 6 inches. For carrying purpose, the top face has a handle 14 mounted thereon. The handle comprises of a flexible strip coupled at opposite ends to the top face.

Next provided is a light assembly 16 including a vertically oriented thin linear recess 18 formed in the rear face of the housing. The recess resides in communication with the top face of the housing and terminates short of the bottom face thereof. A hemispherical recess 20 is formed in the rear face which intersects the linear recess.

The light assembly further includes a first elongated rod 22 having a first end pivotally coupled within the recess adjacent to the top face of the housing. A second short rod 24 has a first end pivotally coupled to a second end of the first elongated rod. Ideally, the short rod has a length less than half that of the elongated rod. A lamp 26 with a hemispherical cover 28 is pivotally coupled at a periphery thereof to a second end of the second short rod. During use, the rods and lamp may be removably situated within the recesses and illuminated upon the receipt of power. It should be noted that a wire runs through the rods for supplying such power in a manner that will soon become apparent. An actuation switch 30 is positioned on the cover of the lamp for selectively precluding and allowing the transfer of power thereto.

Next provided is a video cassette player assembly 32 including a display 34 mounted on the front face of the housing. The display has a surface area less than that of the front face. A plurality of color coded control buttons 36 are mounted to the front face of the housing between the display and one of the side faces of the housing. As shown in FIG. 1, such control buttons include a green start button, red stop button, yellow rewind button, blue eject button and purple actuator button.

A speaker 38 is positioned on the front face of the housing between the display and one of the side faces of the housing opposite the control buttons. Associated with the speaker is a volume dial 40 situated on the top face adjacent to the handle. The dial functions to either limit or augment the magnitude of audio signals being emitted from the speaker. For personal use, a head phone jack 42 is mounted to the rear face of the housing for releasably connecting with a pair of headphones 43. A switch 44 is used to determine to which of the headphones and the speaker audio signals are transmitted.

The video cassette player assembly further includes a video cassette player mechanism 46 having an inlet situated on the front face of the housing below the display. The inlet serves to receive a video cassette so as to display video and audio signals from the video cassette via the display and the speaker, respectively. This operation is governed in accordance with the depression of the control buttons.

Finally, a power unit 48 is included for supplying power to the lamp assembly and video cassette player assembly. The power unit includes a compartment 50 formed in the rear face of the housing adjacent to the bottom face thereof. The compartment has a rechargeable battery holster 51, an auxiliary power jack 52 situated therein, and an interior space 54. The power unit further includes a first power connector 56 for being removably connected between a conventional alternative current source and the auxiliary power jack. The first power connector preferably has a transformer mounted thereon. Associated therewith is a second power connector 58 for being removably connected between a cigarette lighter of a vehicle and the auxiliary power jack. Prior to use, the power connectors may be stored in the interior space and a cover 60 removably mounted thereover for containing the same in the compartment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A compact video cassette player for children comprising, in combination:
    a housing having a rectangular configuration with a square front face, a square rear face, a rectangular top face, a rectangular bottom face and a pair of rectangular side faces, the top face having a handle mounted thereon;
    a light assembly including a vertically oriented thin linear recess formed in the rear face of the housing and in communication with the top face thereof and a hemispherical recess formed in the rear face such that the linear recess intersects the hemispherical recess, the light assembly further including a first elongated rod having a first end pivotally coupled within the recess adjacent to the top face of the housing, a second short rod having a first end pivotally coupled to a second end of the first elongated rod and a lamp with a hemispherical cover pivotally coupled at a periphery thereof to a second end of the second short rod, whereby the first elongated rod, the second short rod, and the lamp may be removably situated within the linear and hemispherical recesses and illuminated upon the receipt of power;
    a video cassette player assembly including a display mounted on the front face of the housing and having a surface area less than that of the front face, a plurality of color coded control buttons mounted to the front face of the housing between the display and one of the side faces of the housing and including a start button, stop button, rewind button, eject button and actuator button, a speaker positioned on the front face of the housing between the display and one of the side faces of the housing opposite the control buttons, and a video cassette player mechanism having an inlet situated on the front face of the housing below the display for receiving a video cassette so as to display video and audio signals via the video cassette from the display and the speaker, respectively, in accordance with the depression of the control buttons; and
    a power unit for supplying power to the lamp assembly and the video cassette player assembly, the power unit including a compartment formed in the rear face of the housing adjacent to the bottom face thereof, the compartment having a battery holster, an auxiliary power jack situated therein, and an interior space, the power unit further including a first power connector for being removably connected between an alternative current source and the auxiliary power jack and a second power connector for being removably connected between a cigarette lighter of a vehicle and the auxiliary power jack, whereby the first and second power connectors may be stored in the interior space prior to use and a cover contains the first and second power connectors in the compartment.

2. A compact video cassette player for children comprising:
    a housing with a front face, a rear face, a top face, a bottom face and a pair of side faces, the top face having a handle mounted thereon;
    a light assembly with a lamp for illuminating upon the receipt of power, the light assembly further including a recess formed in the rear face of the housing and in communication with the top face thereof, the light assembly further including an arm having a first end pivotally coupled within the recess adjacent to the top face of the housing and a second end coupled to the lamp, whereby the arm may be removably situated within the recess;
    a video cassette player assembly including a display mounted on the front face of the housing, a plurality of control buttons including a start button, stop button, rewind button, eject button and actuator button, a speaker positioned on the housing, and a video cassette player mechanism having an inlet for receiving a video cassette so as to display video and audio signals from the video cassette via the display and the speaker, respectively, in accordance with the depression of the control buttons; and
    a power unit for supplying the light assembly and video cassette player assembly with power.

3. A compact video cassette player as set forth in claim 2 wherein the control buttons are positioned on the front face of the housing between the display and one of the side faces of the housing.

4. A compact video cassette player as set forth in claim 2 wherein the control buttons are color coded.

5. A compact video cassette player as set forth in claim 2 wherein the arm includes a first elongated rod having a first end pivotally coupled within the recess adjacent to the top face of the housing and a second short rod having a first end pivotally coupled to a second end of the first elongated rod, the lamp being coupled to a second end of the second short rod.

6. A compact video cassette player as set forth in claim 2 wherein the power unit includes means for receiving power by way of batteries.

7. A compact video cassette player as set forth in claim 2 wherein the power unit includes means for receiving power by way of a vehicular cigarette lighter.

8. A compact video cassette player as set forth in claim 2 wherein the power unit includes means for receiving power by way of an alternating current receptacle.

9. A compact video cassette player as set forth in claim 2 wherein the power unit includes a plurality of means for receiving power by way of a plurality of unique sources, wherein the housing includes a compartment for storing the plurality of means for receiving power prior to use.

* * * * *